Nov. 7, 1933.                J. L. JONES                1,934,353
                          FASTENING DEVICE
                         Filed Dec. 8, 1932

Inventor:
John Lewis Jones,
By
Attorneys.

Patented Nov. 7, 1933

1,934,353

UNITED STATES PATENT OFFICE 1,934,353

FASTENING DEVICE

John Lewis Jones, Liverpool, England

Application December 8, 1932, Serial No. 646,331, and in Great Britain December 12, 1931

11 Claims. (Cl. 24—210)

The present invention relates to fastening devices and has for its object the provision of means for detachably securing together two elements of a closure such as for example, the overlapping elements of handbags, suit cases, gloves and straps. By "detachably securing together" is meant the connection of two elements in such a manner as to permit said elements to function as one until such time as intentional unlocking of the elements is desired.

According to the present invention, and from one aspect thereof, a pair of plates on one element of a closure are provided with openings which individually permit the passage therethrough of a locking element on the other element of the closure when the plates are separated but retain the locking element therein when the plates are in juxtaposition.

From another aspect of the invention a pair of hingedly connected plates are provided with openings so situated in the plates as to permit the passage of a locking element through the individual plates but prevent the passage through the combined opening formed by said openings when the plates are in juxtaposition.

The openings in the hinged plates are relatively eccentric to enable the stud having an enlarged head to pass through said openings when the plates are separated and yet to prevent movement of the stud within the openings when the plates are in juxtaposition.

The invention is more particularly described with reference to the accompanying drawing, in which:—

Figure 1:
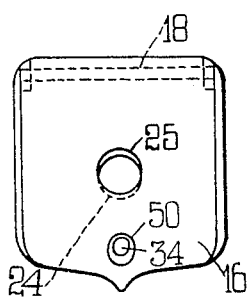
Figure 1 is a plan view of a pair of plates adapted to be secured to one element of a closure such as the flap of a handbag, this construction showing the relative disposition of the holes in the plates when the outer plate takes up a shrouding position on the inner plate.
Figure 3:
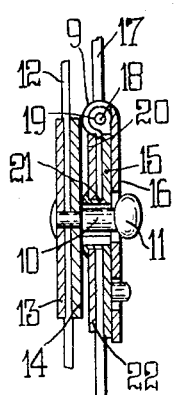
Figure 3 is a section through a pair of plates shown in Figures 1 and 2, and showing a suitable stud having an enlarged head which is mounted on the other member of the closure, namely, one wall of the bag, the positions of the various elements corresponding to the locked state of the bag.
Figure 2:
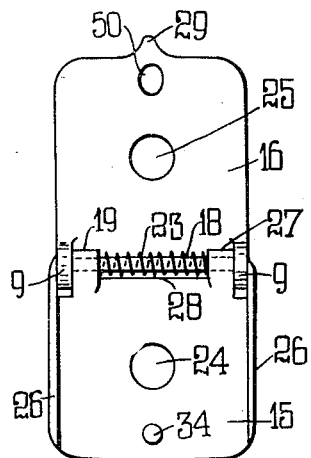
Figure 2 is a corresponding view of the plates of Figure 1, but with the outer plate angularly displaced relatively to the inner plate.

In the construction according to Figures 1–3 a stud 10 having an enlarged head 11 is secured to one element 12 of a closure such as a handbag, the connection between the stud and the element 12 being by way of a pair of spaced discs 13, 14 rigidly secured to the shank of the stud and between which discs the element 12 is gripped.

A pair of hinged plates 15, 16 are mounted on the outer face of the other element 17 of the closure, the outer plate 16 being capable of angular displacement relative to the inner plate 15 by means of a hinge pin 18 passing through rolled over lugs 19 of the inner plate and ears 9 on the outer plate 16 a spring 23 being interposed between the hinge pin and the plates.

The inner plate 15 is rigidly secured to the element 17 of the handbag by means of a hollow rivet 21 passing through the element 17 and connected on the rear face of the latter with a base plate or washer 22 so that the element 17 is rigidly gripped between the plate 15 and the washer 22.

Each of the plates 15, 16, which in the particular form of construction shown in Figures 1–3 are of shield shape, is provided with a hole, the hole 24 of the plate 15 being disposed eccentrically of the hole 25 of the plate 16 when the latter is in juxtaposition to the former as is shown in Figure 1.

In order to prevent relative side play between the plates 15 and 16, the inner plate 15 has flanged side walls 26, the upper edges of which lie flush with the upper face of the plate 16 when this shrouds the plate 15, that is to say the height of the flanged walls 26 is substanially equal to the thickness of the plate 16.

It will be observed that the hinged connection between the plates is of such a nature as to provide a smooth outer face for the plate 16, that is to say the hinge is housed within a rearwardly rolled-over end of the plate 16, in fact, the hinge pin lies slightly in rear of the inner or base plate 15 and passes through bearing lugs 19 thereof, and situated beyond the transverse extremity 28 of the plate 15.

The construction according to Figures 1–3 is particularly suitable for use with hand bags wherein the element 17 functions as a flap to shroud the opening of a bag of which the element 12 constitutes the front wall. The plates 15 and 16 are preferably provided near the base of the flap, and it will be observed from examination of Figures 1-3 that the hole 25 in the upper plate 16 is further from the free edge of the flap 17 than the hole 24 in the inner plate 15. The hole 25 in the upper plate may however be placed further from the hinge than the hole 24 in the lower plate and this latter construction has the advantage that when the elements of the closure are under stress the lower plate will abut against the stud shank and take the majority of the stress so that the top plate 16 may be more freely moved to open the closure.

In operation, the elements 12, 17 of the bag are brought together so that the head 11 of the press stud 10 is pressed into the opening 24 of the lower plate 15 whereupon it slightly lifts the upper plate 16 due to the eccentricity of the holes 24, 25, the head 11 of the stud being only slightly less in diameter than the diameter of the openings 24, 25. This displacement of the upper plate 16 is only slight but is sufficient to permit the stud to pass through the holes 24 and 25 separately and individually when the upper plate 16 will then resume its shrouding position on the lower plate 15 due to the action of the spring 23.

In this position the head of the stud is prevented from retreating through the combined hole formed by the holes 24, 25 as this combined hole which is substantially elliptical as shown in Figure 1 is less than the diameter of the head 11. In consequence, the enlarged head is firmly gripped on the plates and prevents separation of the elements 12, 17 of the bag until the upper plate 16 is angularly displaced relatively to the lower plate 15 thus separately removing the plate 16 from engaging with the head of the stud and permitting the passage of the stud separately through the openings 24 and 25. Any outward pull on the element 17 away from the element 12 will tend to more rigidly lock the connection instead of unlock it.

It will thus be appreciated that as the outer plate 16 fits snugly on the inner plate 15 and between the side walls 26 of the latter it is not readily apparent to the eye of an observer that separation can be effected between the plates 15 and 16 in consequence, unauthorized access to the contents of the bag is not immediately available.

When locking the closure by pressure on the top plate some resistance is offered to the lifting of the plate and to avoid this a projection may be provided on the lower plate 15 passing through a clearance hole 50 in the top plate 16, when closing pressure may then be applied to the lower plate through the projection 34 thus permitting the top plate to lift freely and allow the stud to pass therethrough. In place of the projection 34 any part of the lower plate may be extended beyond the top plate so that pressure may be exerted on the lower plate only when closing. This extension is of greatest use when the fastening device is employed on narrow straps.

Figure 4:
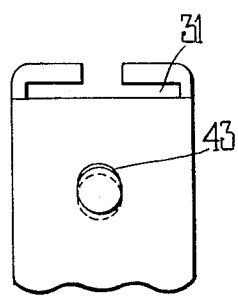
Figure 4 shows a modified form of construction of hinged plates suitable for use with a strap of a wristlet watch for example, this view, as regards the disposition of the elements, corresponding to that of Figure 1.
Figure 6:
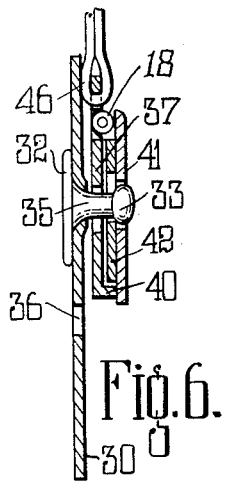
Figure 6 is a sectional view through a closure embodying the plates of Figures 4 and 5.
Figure 5:
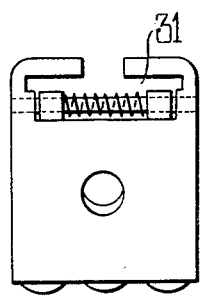
Figure 5 is a corresponding view of the rear of the inner plate.

In the modified form of construction illustrated in Figures 4, 5 and 6 a stud 35 having a base plate 32 and an enlarged head 33 is passed through one of a number of holes 36 in a strap 30, such as a wrist watch strap. The other end of the strap 30 has an eye 46 which is threaded into an open eye 31 on the lower plate 37 of the device. The construction of the plate 37 may be substantially similar to that of the plate 15 in Figures 1-3, but preferably, in addition to having flanged side walls similar to those illustrated at 26 in Figure 2, may have a flanged wall 40 along that transverse edge remote from the hinge.

The upper plate 41 has rigidly secured to it an auxiliary plate 42 of slightly less area so that the upper plate 41 may shroud the hinged connection with the plate 37 and in addition, may project at the opposite end beyond the plate 42 which latter plate is adapted to lie snugly within the bounding wall 40 of the lower plate 37 when the two plates 41, 37 lie in juxtaposition. In such a construction the wall 40 is adapted to take the pressure from the hinge 18 when tension is applied to the opposite ends of the strap.

As regards the feature of eccentricity of holes in the upper and lower plates 41, 37 this is similar to that already described in connection with Figures 1-3. If desired, in addition the hole in the auxiliary plate 42 may be slightly eccentric to that of the hole 43 in the plate 41.

The construction according to Figures 4-6 functions in exactly the same manner as that in the preceding figures.

It will be obvious that the invention is not limited to the particular shape of plate shown in the drawing. For example, the plates instead of being of shield formation may be of substantially circular, elliptical, semi-circular, hexagonal, octagonal or any other desired shape. Again, instead of being wholly uniplanar as in the construction shown in Figure 3 for example, the plates in cross section may be slightly curved to conform with the contour of the wrist of the user.

Further, any desired form of hinge may be used for pivotally interconnecting the outer and inner plates of one element of the closure and the invention is not limited to the particular form of construction of hinge shown in the drawing. Again, as regards the press stud, this may be of any desired form. It may either be rigid with the base plate on which it is mounted or it may be detachable therefrom whilst the shape of the base plate of the stud is wholly immaterial. The most convenient form is a circular shape if it has to be rigidly secured to the element of a bag for example. A tubular connection for the lower plate to its element has been described but the invention also is not limited to this particular form of connection as any other interconnecting means enabling rigidity of connection between the lower plate and its closure element may be used.

The top plate of the closure may be provided with a covering of any desired material which may cover the opening therein and which may be secured in a convenient manner for instance by rivets on the case of a covering of metal or of celluloid composition.

In the case in which relatively thick hinged plates are used at least one of the holes in the plates may be drilled obliquely to the surface of the plate and so arranged in the plates that the holes become coaxial when the upper plate is raised to permit the free passage of the stud therethrough.

I declare that what I claim is:—

1. A fastening device comprising a stud, a pair of rigid plates hingedly connected together and having disaligned openings therein which individually permit the free passage therethrough of the head of the stud when the plates are separated by relative angular displacement about an axis parallel to the planes of the plates but collectively retain the head of the stud therein when the plates are in juxtaposition.

2. A fastening device comprising a stud, a pair of plates having openings therein so situated as to permit the passage of the head of said stud through the individual plates, but to prevent the passage therethrough of the combined opening formed by the openings in said plates when the plates are in juxtaposition and hinged means extending transversely across the plates and connecting the said plates together yet permitting relative angular displacement of the plates in planes normal to the plates.

3. A fastening device comprising a stud having a head thereon, a pair of plates of greater thickness than the diameter of the head of said stud having holes therein drilled on non-coincident axes when said plates lie in parallel planes and so that the axes become coincident when the plates are in position to the passage of said stud through the holes in said plates and hinged means extending parallel to the planes of the plates for connecting said plates together.

4. A fastening device comprising a stud, a pair of plates having disaligned openings therein which individually permit the free passage therethrough of the head of the stud when the plates are relatively angularly displaced and collectively retain the head of the stud when the plates are in juxtaposition, hinged means connecting said plates together and interengaging means on said plates to relieve the strain on said hinged means when force is applied to the element of the closure.

5. A fastening device comprising a stud, a pair of plates having disaligned openings therein which individually permit the free passage therethrough of the head of the stud when the plates are relatively angularly displaced and collectively retain the head of the stud when the plates are in juxtaposition, hinged means extending parallel to the planes of said plates when in juxtaposition and connecting said plates together, and spring means resiliently urging said plates together in face contact.

6. A fastening device comprising a stud, a pair of hinged plates having disaligned openings therein which individually permit the free passage therethrough of the head of the stud when the plates are relatively angularly displaced and collectively retain the head of the stud when the plates are in juxtaposition, hinged means connecting said plates together, and an upstanding flange on one of said plates engaging a part of the periphery of the other plate when said plates are in juxtaposition.

7. A fastening device comprising a stud, a pair of plates having disaligned openings therein which individually permit the free passage therethrough of the head of the stud when the plates are relatively angularly displaced and collectively retain the head of the stud when the plates are in juxtaposition, a pair of rolled eyes at one end of one of said plates, upstanding ears at one end of the other of said plates, a hinged pin passing through said eyes and said ears and a spring arranged about said hinged pin to urge said plates together.

8. A fastening device comprising a stud, a pair of hinged plates having disaligned openings therein which individually permit the free passage therethrough of the head of the stud when the plates are relatively angularly displaced and collectively retain the head of the stud when the plates are in juxtaposition, hinged means connecting said plates together and an open eye extending from one of said plates for securing a strap forming one element of the closure.

9. A fastening device for a closure comprising a stud, a pair of plates having disaligned openings therein which individually permit the free passage therethrough of the head of the stud when the plates are relatively angularly displaced and collectively retain the head of the stud when the plates are in juxtaposition, hinged means lying in a plane parallel to one of the plates, and connecting said plates together, and a projection on one plate extending beyond the other plate for engagement by the finger to separate said plates by relative angular displacement in planes normal to that of the plates.

10. A fastening device for a closure, comprising a stud secured to one element of the closure and having an enlarged head thereon, a pair of plates one of which is secured to the other element of the closure and having eccentric openings therein which individually permit the free passage therethrough of the head of the stud when the plates are relatively angularly displaced and collectively retain the head of the stud when the plates are in juxtaposition and hinged means with its axis lying in a plane parallel to one of the plates and connecting the two plates together.

11. A fastening device for a closure comprising a stud on one part of said closure, a head on said stud, a hinge, and a pair of uniplanar plates on the other part of said closure and connected to said hinge with one plate wholly shrouding the other when the plates are in juxtaposition said plates having disaligned holes therein which individually permit the free passage therethrough of the head of the stud when the plates are relatively angularly displaced and collectively retain the head of the stud when the plates are in juxtaposition.

JOHN LEWIS JONES.